United States Patent
Duncan et al.

(10) Patent No.: US 12,273,029 B2
(45) Date of Patent: Apr. 8, 2025

(54) SWITCH-MODE POWER SUPPLY WITH A NETWORK OF FLYING CAPACITORS AND SWITCHES

(71) Applicant: Qualcomm Incorporated, San Diego, CA (US)

(72) Inventors: Joseph Duncan, Carlsbad, CA (US); Chengwu Tao, Palo Alto, CA (US); Joseph Dale Rutkowski, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,475

(22) Filed: Sep. 22, 2021

(65) Prior Publication Data

US 2023/0089910 A1    Mar. 23, 2023

(51) Int. Cl.
*H02M 3/158*    (2006.01)
*H02M 1/00*    (2006.01)

(52) U.S. Cl.
CPC ......... *H02M 3/158* (2013.01); *H02M 1/0095* (2021.05)

(58) Field of Classification Search
CPC ............... H02M 3/158; H02M 3/1582; H02M 3/1584; H02M 3/1586; H02M 3/156; H02M 3/1563; H02M 3/1566; H02M 3/1557; H02M 3/155; H02M 3/1555; H02M 1/0095

See application file for complete search history.

(56) References Cited

U.S. PATENT DOCUMENTS

| | | | |
|---|---|---|---|
| 10,476,390 B2 * | 11/2019 | Petersen | H02M 3/1582 |
| 10,622,899 B1 | 4/2020 | De Cremoux | |
| 2019/0207519 A1 | 7/2019 | Chakraborty et al. | |
| 2020/0144909 A1 | 5/2020 | Baek et al. | |
| 2020/0295655 A1 | 9/2020 | Takahiro et al. | |
| 2020/0381996 A1 * | 12/2020 | Khlat | H03F 3/19 |
| 2022/0123653 A1 * | 4/2022 | Youn | H02M 3/18 |

OTHER PUBLICATIONS

Baek J., et al., "A Voltage-Tolerant Three-Level Buck-Boost DC-DC Converter with Continuous Transfer Current and Flying Capacitor Soft Charger Achieving 96.8% Power Efficiency and 0.87μs/V DVS Rate," IEEE International Solid-State Circuits Conference, Feb. 18, 2020, 3 pages.

International Search Report and Written Opinion—PCT/US2022/075333—ISA/EPO—Nov. 17, 2022, 11 pages.

* cited by examiner

*Primary Examiner* — Nguyen Tran

(74) *Attorney, Agent, or Firm* — Loza & Loza, LLP/Qualcomm

(57) ABSTRACT

An apparatus is disclosed for a switch-mode power supply with a network of flying capacitors and switches. In an example aspect, the apparatus includes a switch-mode power supply with an inductor, a switching circuit, and a network of flying capacitors and switches. The switching circuit is coupled to the inductor. The network of flying capacitors and switches is coupled to the switching circuit and includes at least two flying capacitors and multiple switches. The multiple switches are configured to selectively connect the at least two flying capacitors in parallel between a first terminal of the network of flying capacitors and switches and a second terminal of the network of flying capacitors and switches or connect the at least two flying capacitors in series between the first terminal and the second terminal.

16 Claims, 10 Drawing Sheets

SWITCH-MODE POWER SUPPLY WITH A NETWORK OF FLYING CAPACITORS AND SWITCHES

TECHNICAL FIELD

This disclosure relates generally to switch-mode power supplies and, more specifically, to implementing a switch-mode power supply with a network of flying capacitors and switches.

BACKGROUND

An electronic device can include a switch-mode power supply to transfer power from a power source, such as the battery, to other components of the electronic device. In some situations, an input voltage provided by the power source to the switch-mode power supply can vary. During mobile operation of the electronic device, for example, depletion of the battery can cause the input voltage provided to the switch-mode power supply to decrease. Also, loading conditions on the switch-mode power supply can change as a user of the electronic device activates different types and/or quantities of applications and features. It is therefore desirable to design a switch-mode power supply that can operate across a wide range of input voltages and loading conditions.

SUMMARY

An apparatus is disclosed that implements a switch-mode power supply with a network of flying capacitors and switches. The switch-mode power supply includes a multi-level buck-boost regulator with a boost regulator (e.g., charge pump or boost converter) integrated within a buck regulator (e.g., a buck converter). With the integrated boost regulator, the switch-mode power supply can generate a continuous output current during a boost mode. With the continuous output current, the switch-mode power supply can achieve a lower output noise and a higher loop-regulation bandwidth (e.g., a faster transient response) relative to other switch-mode power supplies that generate a discontinuous output current.

The switch-mode power supply can also use the network of flying capacitors and switches to generate an output voltage that is greater than twice an input voltage during the boost mode. Generally, the switch-mode power supply uses the network of flying capacitors and switches to implement a multiply-by-N boost regulator, where N represents a positive integer (e.g., 1, 2, 3, or 4). In this manner, the switch-mode power supply can be dynamically configured to provide an appropriate conversion ratio for different power supplies and/or loading conditions during the boost mode.

In an example aspect, an apparatus is disclosed. The apparatus includes a switch-mode power supply with an inductor, a switching circuit, and a network of flying capacitors and switches. The switching circuit is coupled to the inductor. The network of flying capacitors and switches is coupled to the switching circuit and includes at least two flying capacitors and multiple switches. The multiple switches are configured to selectively connect the at least two flying capacitors in parallel between a first terminal of the network of flying capacitors and switches and a second terminal of the network of flying capacitors and switches or connect the at least two flying capacitors in series between the first terminal and the second terminal.

In an example aspect, an apparatus is disclosed. The apparatus includes a switch-mode power supply configured to be coupled to a power source. The switch-mode power supply includes inductance means for storing energy and capacitance means for storing energy. The switch-mode power supply also includes first switching means for connecting the inductor means and the capacitance means to the power source and alternating between charging and discharging the capacitance means. The switch-mode power supply also includes second switching means for alternating between connecting the capacitance means in a parallel configuration and connecting the capacitance means in a series configuration.

In an example aspect, a method for operating a switch-mode power supply is disclosed. The method includes accepting an input voltage from a power source. The method also includes generating an output voltage that is greater than the input voltage. The generating of the output voltage includes charging multiple flying capacitors of a network of flying capacitors and switches of the switch-mode power supply in a parallel configuration. The generating of the output voltage also includes discharging the multiple flying capacitors in a series configuration.

In an example aspect, an apparatus is disclosed. The apparatus includes a switch-mode power supply with an inductor, a switching circuit, and a network of flying capacitors and switches. The switching circuit is coupled to the inductor. The network of flying capacitors and switches is coupled to the switching circuit. The switch-mode power supply is configured to operate according to a boost mode. The switch-mode power supply is also configured to generate a continuous output current that passes through the inductor based on the switching circuit coupling the power source to the inductor. The switch-mode power supply is additionally configured to provide at least two conversion ratios by using switches of the network of flying capacitors and switches to connect flying capacitors of the network of flying capacitors in at least two configuration to the switching circuit.

BRIEF DESCRIPTION OF DRAWINGS

FIG. 4-1 illustrates an example implementation of a network of flying capacitors and switches.

FIG. 4-2 illustrates another example implementation of a network of flying capacitors and switches.

FIG. 5-1 illustrates example operation of a switch-mode power supply to realize a 2:1 conversion ratio using a network of flying capacitors and switches.

FIG. 5-2 illustrates an example graph of a voltage at a switch node and an example state diagram of switches within a switch-mode power supply to realize a 2:1 conversion ratio.

FIG. 6-1 illustrates example operation of a switch-mode power supply to realize a 3:1 conversion ratio using a network of flying capacitors and switches.

FIG. 6-2 illustrates an example graph of a voltage at a switch node and an example state diagram of switches within a switch-mode power supply to realize a 3:1 conversion ratio.

DETAILED DESCRIPTION

It may be desirable to design a switch-mode power supply that can operate with a variety of input voltages and loading conditions. Some switch-mode power supplies include a switch directly in series with an output. In order to operate according to a boost mode, the switch opens for a portion of time, which disrupts the flow of current to the output. This causes the switch-mode power supply to generate discontinuous output current, which can contribute to noise at the output. Also, the operation of the switch results in limited loop-regulation bandwidth, which slows the transient response of the switch-mode power supply.

To resolve these issues, other switch-mode power supply designs can provide continuous output current to achieve a lower noise level and faster transient response than the switch-mode power supplies that provide discontinuous output current. However, these designs can have less power conversion efficiency, a significantly larger footprint due to the use of additional passive components, and/or a limited conversion ratio compared to the switch-mode power supply that generates discontinuous output current.

In contrast, techniques for implementing a switch-mode power supply with a network of flying capacitors and switches are described herein. The described techniques implement the switch-mode power supply as a multi-level buck-boost regulator with a boost regulator (e.g., charge pump or boost converter) integrated within a buck regulator (e.g., a buck converter). With the integrated boost regulator, the switch-mode power supply can generate a continuous output current during a boost mode. The continuous output current enables the switch-mode power supply to realize a lower output noise and a higher loop-regulation bandwidth (e.g., a faster transient response) relative to other switch-mode power supplies that generate a discontinuous output current.

The switch-mode power supply can also use the network of flying capacitors and switches to generate an output voltage that is greater than twice an input voltage during the boost mode. Generally, the switch-mode power supply uses the network of flying capacitors and switches to implement a multiply-by-N boost regulator, where N represents a positive integer (e.g., 1, 2, 3, or 4). In this manner, the switch-mode power supply can be dynamically configured to provide an appropriate conversion ratio for different power supplies and/or loading conditions during the boost mode.

Figure 1:
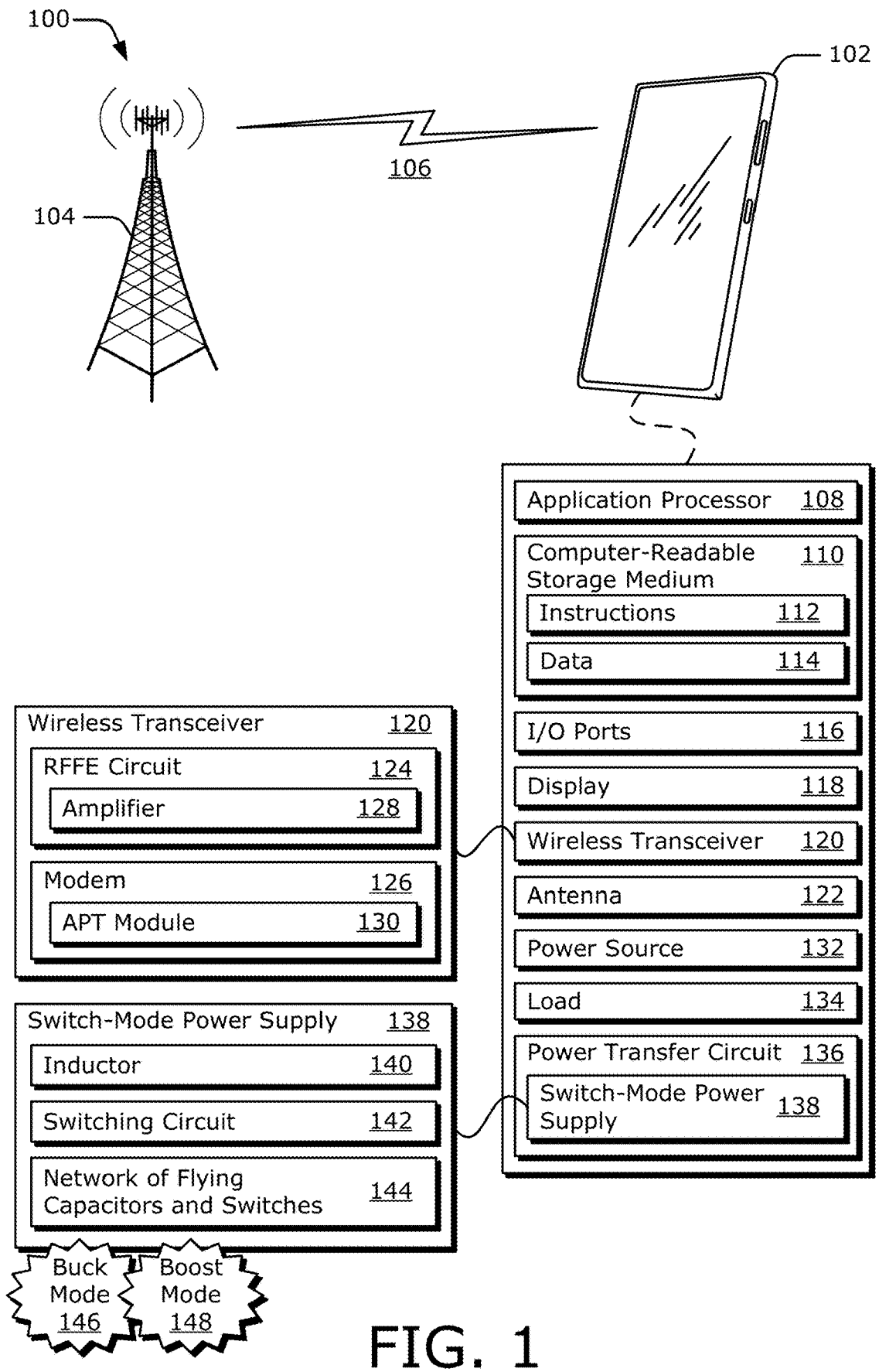
FIG. 1 illustrates an example operating environment for a switch-mode power supply with a network of flying capacitors and switches.

FIG. 1 illustrates an example environment 100 for operating a switch-mode power supply with a network of flying capacitors and switches. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device with a wireless interface, such as a satellite, a server device, a terrestrial television broadcast tower, an access point, a peer-to-peer device, a mesh network node, and so forth. Therefore, the computing device 102 may communicate with the base station 104 or another device via wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular; IEEE 802.11 (e.g., Wi-Fi®); IEEE 802.15 (e.g., Bluetooth®); IEEE 802.16 (e.g., WiMAX®); and so forth. In some implementations, the wireless link 106 may wirelessly provide power and the base station 104 may include a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented.

A wireless transceiver 120 of the computing device 102 provides connectivity to respective networks and other electronic devices connected therewith. The wireless transceiver 120 can facilitate communication over any suitable type of wireless network, such as a wireless local area network (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via an antenna 122. Components of the wireless transceiver 120 can include amplifiers, switches, mixers, analog-to-digital converters, filters, and so forth for conditioning the communication signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antenna 122.

The wireless transceiver 120 includes at least one radio-frequency front-end (RFFE) circuit 124 (RFFE circuit 124) and at least one modem 126. The radio-frequency front-end circuit 124 can be implemented using one or more integrated circuits and includes at least one amplifier 128. As an example, the amplifier 128 can be a power amplifier. The amplifier 128 can be implemented using one or more transistors, such as a n-channel metal-oxide-semiconductor field-effect transistor (NMOSFET), a p-channel metal-oxide-semiconductor field-effect transistor (PMOSFET), or some combination thereof. In general, the radio-frequency front-end circuit 124 conditions signals associated with radio frequencies (e.g., frequencies approximately between 20 kHz and 300 GHz).

Although not explicitly shown, the modem 126 can include at least one processor and CRM, which stores computer-executable instructions (such as the application processor 108, the CRM 110, and the instructions 112). The processor and the CRM can be localized at one module or one integrated circuit chip or can be distributed across multiple modules or chips. Together, the processor and associated instructions can be realized in separate circuitry, fixed logic circuitry, hard-coded logic, and so forth. In some implementations, the modem 126 can include a portion of the CRM 110, can access the CRM 110 to obtain computer-readable instructions, or can include a separate CRM. The modem 126 can be implemented as part of the wireless transceiver 120, the application processor 108, a communication processor, a general-purpose processor, some combination thereof, and so forth.

The modem 126 controls the wireless transceiver 120 and enables wireless communication to be performed. The modem 126 can include baseband circuitry to perform high-rate sampling processes that can include analog-to-digital conversion, digital-to-analog conversion, gain correction, skew correction, frequency translation, and so forth. The modem 126 can provide communication data for transmission and process a baseband signal to generate data, which can be provided to other parts of the computing device 102 for wireless communication.

The modem 126 implements an average-power-tracking (APT) module 130 (APT module 130). The average-power-tracking module 130 adjusts a supply voltage that is provided to the amplifier 128 according to a given waveform of a radio-frequency signal and a target average output power for a given timeslot. By adjusting the supply voltage, the average-power-tracking module 130 can improve the efficiency of the amplifier 128 across various waveforms and conserves power within the computing device 102. This in turn extends mobile operation of the computing device 102 and can reduce power usage of computing devices that are not operating on batteries.

The computing device 102 also includes at least one power source 132, at least one load 134, and at least one power transfer circuit 136. The power source 132 can represent a variety of different types of power sources, including a wired or wireless power source, a solar charger, a portable charging station, a wireless charger, a battery, and so forth. Depending on the type of computing device 102, the battery may include a lithium-ion battery, a lithium polymer battery, a nickel-metal hydride battery, a nickel-cadmium battery, a lead acid battery, and so forth. In some cases, the battery can include multiple batteries, such as a main battery and a supplemental battery, and/or multiple battery cell combinations.

The power transfer circuit 136 transfers power from the power source 132 to one or more loads 134 of the computing device 102. Generally, the power level provided via the power transfer circuit 136 and the power source 132 is at a level sufficient to power the one or more loads 134. For example, the power level may be on the order of milliwatts (mW) for powering loads associated with a smartphone or on the order of watts to kilowatts (kW) for powering loads associated with an electric vehicle. Example types of loads include a variable load, a load associated with a component of the computing device 102 (e.g., the application processor 108, the amplifier 128 of the radio-frequency front-end circuit 124, the display 118, a battery, or a power converter), a load that is external from the computing device 102 (e.g., another battery), and so forth. The power transfer circuit 136 can be a stand-alone component or integrated within another component, such as a power management integrated circuit (PMIC) (not shown).

The power transfer circuit 136 includes at least one switch-mode power supply 138. The switch-mode power supply 138 uses switches and passive storage components to transfer power between the power source 132 and the load 134. In an example implementation, the switch-mode power supply 138 includes at least one inductor 140, at least one switching circuit 142, and at least one network of flying capacitors and switches 144, which are further described with respect to FIG. 3. The inductor 140, the switching circuit 142, and the network of flying capacitors and switches 144 implement, at least in part, a multi-level buck regulator with an integrated boost regulator.

The switch-mode power supply 138 can selectively operate according to a buck mode 146 or a boost mode 148. During the buck mode 146, the switch-mode power supply 138 provides an output voltage at a level that is less than a level of an input voltage. During the boost mode 148, the switch-mode power supply 138 provides the output voltage at another level that is greater than the level of the input voltage. With the integrated boost regulator, the switch-mode power supply 138 can provide a continuous output current during the boost mode 148. Also, the network of flying capacitors and switches 144 enables the switch-mode power supply 138 to have an adjustable conversion ratio during the boost mode 148. For example, the switch-mode power supply 138 can selectively realize a 2:1 conversion ratio, a 3:1 conversion ratio, or an N:1 conversion ratio.

Although not shown, the power transfer circuit 136 can include other types of control circuitry that controls operation of the switch-mode power supply 138. For example, this control circuitry can monitor operation of the switch-mode power supply 138 and control the pulse-width modulation of the switching circuit 142. The switch-mode power supply 138 is further described with respect to FIG. 2.

Figure 2:
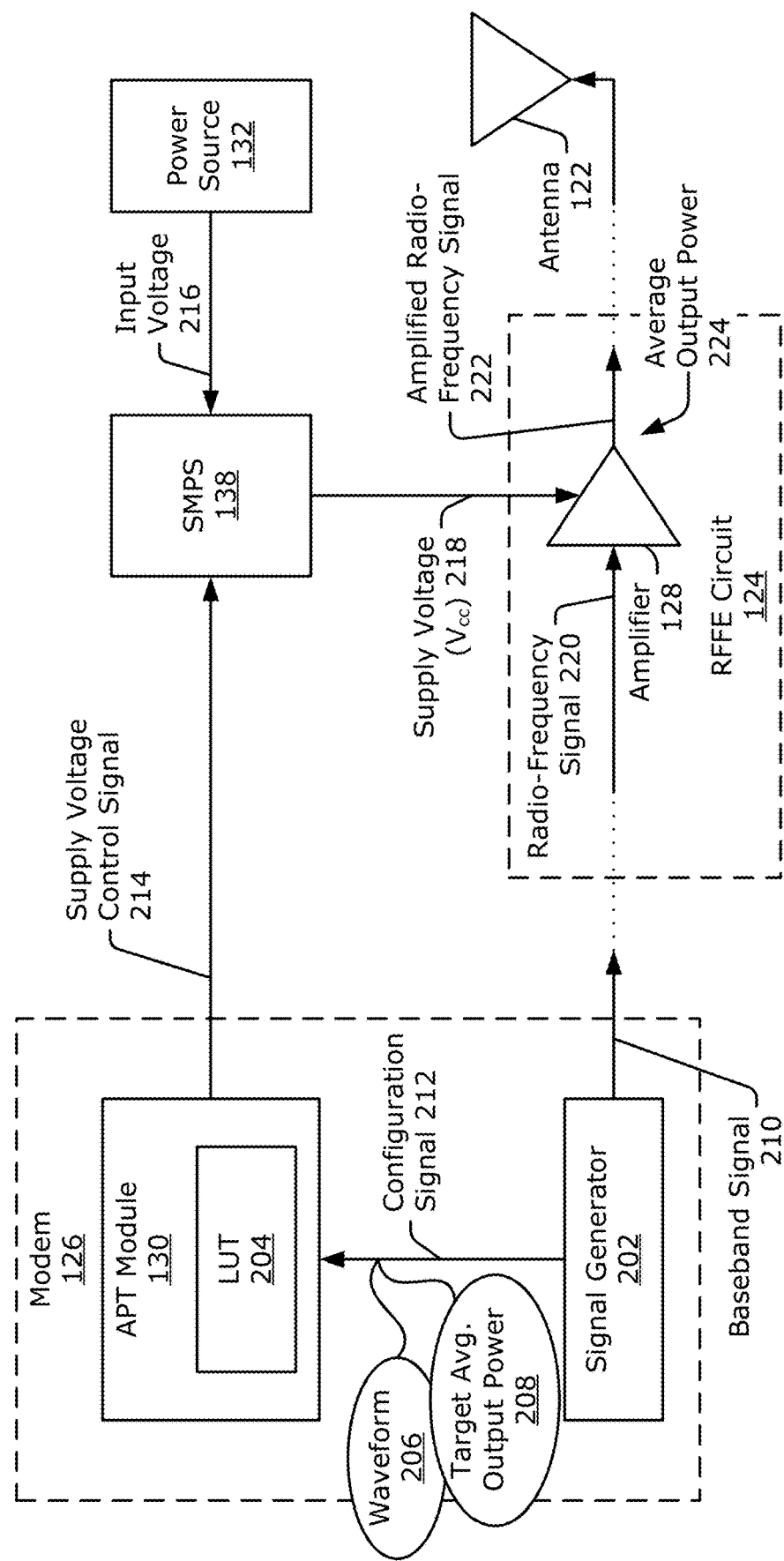
FIG. 2 illustrates an example modem, an example switch-mode power supply, an example power source, and an example radio-frequency front-end circuit.

FIG. 2 illustrates an example radio-frequency front-end circuit 124, an example modem 126, an example power source 132, and an example switch-mode power supply 138 (SMPS 138). In the depicted configuration, the modem 126 is coupled to the switch-mode power supply 138 and the radio-frequency front-end circuit 124. Although not shown, other integrated circuits can be coupled between the modem 126 and the radio-frequency front-end circuit 124, such as a baseband circuit and/or an intermediate-frequency circuit. These circuits can upconvert signals from baseband or intermediate frequencies to radio frequencies. The radio-frequency front-end circuit 124 is also coupled to the switch-mode power supply 138 and the antenna 122.

The modem 126 includes the average-power-tracking module 130 and a signal generator 202. The average-power-tracking module 130 includes at least one lookup table (LUT) 204 (LUT 204), which maps target average output powers to supply voltages for a particular waveform. The lookup table 204 can also include additional information that enables the supply voltage to be further determined for various gain indexes (e.g., radio-frequency gain indexes (RGI)) or quiescent currents ($I_{CQ}$).

The switch-mode power supply 138 is coupled to the average-power-tracking module 130 and the power source 132. The average-power-tracking module 130 controls operation of the switch-mode power supply 138. For example, the average-power-tracking module 130 can cause the switch-mode power supply 138 to operate according to the buck mode 146 or the boost mode 148. Additionally, the average-power-tracking module 130 can specify a conversion ratio of the switch-mode power supply 138, such as one of the multiple conversion ratios for the boost mode 148.

The radio-frequency front-end circuit 124 includes the amplifier 128, which is coupled to the signal generator 202. In this example, the amplifier 128 amplifies signals for transmission. Although not shown, the radio-frequency front-end circuit 124 can include other components, such as a mixer, a filter, a switch, or a phase shifter.

During operation, the signal generator 202 selects a waveform 206 and a target average output power 208 for transmitting a wireless communication signal (e.g., an uplink signal) via the antenna 122. As an example, the waveform 206 can be a discrete-Fourier-transform spread orthogonal-frequency-division-multiplexing (DFT-S-OFDM) waveform or a cyclic-prefix orthogonal-frequency-division-multiplexing (CP-OFDM) waveform. The waveform 206 can also be associated with a particular modulation type (e.g., quadrature phase-shift-keying (QPSK) or quadrature-amplitude-modulation (QAM)), a particular quantity of resource blocks (RBs) (e.g., a particular bandwidth), a particular spacing between carriers, or some combination thereof.

The signal generator 202 generates a baseband signal 210 based on the selected waveform 206 and generates a configuration signal 212. The configuration signal 212 contains information identifying the selected waveform 206 and the target average output power 208.

The average-power-tracking module 130 accepts the configuration signal 212 and generates a supply voltage control signal 214 based on the configuration signal 212. In particular, the average-power-tracking module 130 uses the lookup table 204 to map the target average output power 208 to a supply voltage for the selected waveform 206. The supply voltage control signal 214 contains information specifying the selected supply voltage.

The switch-mode power supply 138 accepts an input voltage 216 from the power source 132 and the supply voltage control signal 214 from the average-power-tracking module 130. Using the input voltage 216, the switch-mode power supply 138 generates a supply voltage ($V_{cc}$) 218 (e.g., an output voltage) according to the target supply voltage specified by the supply voltage control signal 214. The supply voltage 218 can be less than or greater than the input voltage 216. As an example, the supply voltage 218 can be approximately between 0.4 and 8 volts and the input voltage can be approximately between 2.5 and 5 volts. The switch-mode power supply 138 provides the supply voltage 218 to the amplifier 128.

The amplifier 128 accepts a radio-frequency signal 220 and the supply voltage 218. The radio-frequency signal 220 represents a version of the baseband signal 210, which has been upconverted to radio frequencies by other components within the radio-frequency front-end circuit 124 and/or the wireless transceiver 120. The amplifier 128 amplifies the radio-frequency signal 220 using the supply voltage 218 to generate an amplified radio-frequency signal 222. The amplified radio-frequency signal 222 has an average output power 224 during a given timeslot. The average output power 224 is approximately equal to the target average output power 208. The antenna 122 accepts the amplified radio-frequency signal 222 and transmits the amplified radio-frequency signal 222.

In general, the supply voltage 218 specified by the average-power-tracking module 130 enables the amplifier 128 to operate at a target efficiency for amplifying the radio-frequency signal 220 with the given waveform 206 and across various average output powers. As an example, the target efficiency can be approximately 80% or greater (e.g., greater than 90%). As time progresses, the average-power-tracking module 130 causes the switch-mode power supply 138 to adjust the supply voltage 218 according to the changing target average output power 208 specified by the configuration signal 212. The switch-mode power supply 138 is further described with respect to FIG. 3.

Figure 3:
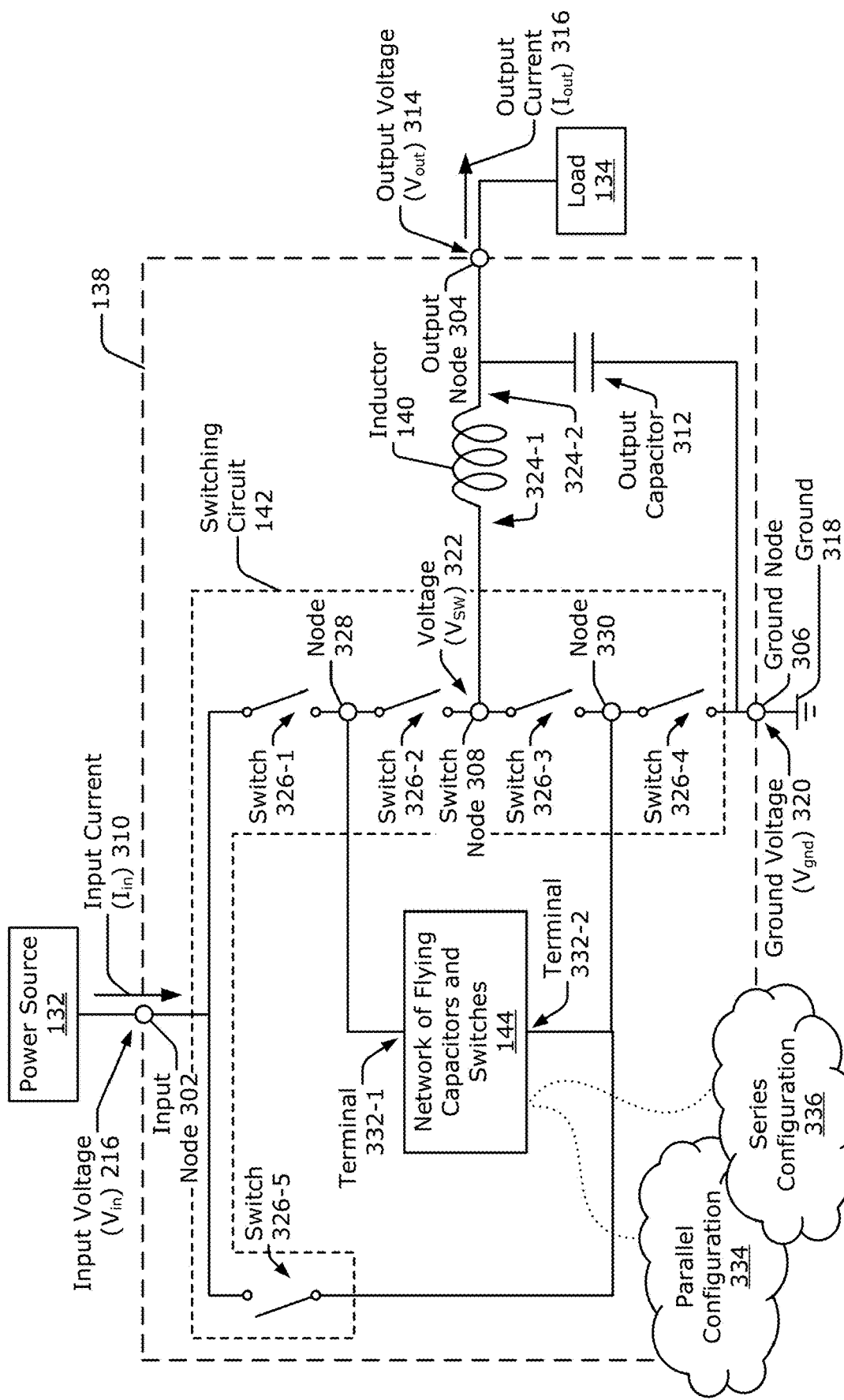
FIG. 3 illustrates an example power source, an example load, and an example switch-mode power supply with a network of flying capacitors and switches.

FIG. 3 illustrates an example power source 132, an example load 134, and an example switch-mode power supply 138 with a network of flying capacitors and switches 144. The switch-mode power supply 138 is coupled between the power source 132 and the load 134. The switch-mode power supply 138 includes the inductor 140, the switching circuit 142, and the network of flying capacitors and switches 144. Although not shown, the switch-mode power supply 138 can also include a decoupling capacitor coupled between the input node 302 and the ground node 306. In some implementations, the switch-mode power supply 138 is implemented on a package or printed circuit board (PCB).

The switch-mode power supply 138 also includes an input node 302, an output node 304, a ground node 306, and a switch node 308. The term "node" represents at least a point of electrical connection between two or more components (e.g., circuit elements). Although visually depicted as a single point, the node represents a connected portion of a network that has approximately a same voltage potential between two or more components. In other words, a node can represent at least one of multiple points along a conducting medium (e.g., a wire or trace) that exists between electrically connected components.

The input node 302 couples together the power source 132 and the switching circuit 142. At the input node 302, the switch-mode power supply 138 accepts both the input voltage ($V_{in}$) 216 and an input current ($I_{in}$) 310 from the power source 132. The output node 304 couples together the inductor 140, an output capacitor 312, and the load 134. The output capacitor 312 is coupled between the output node 304 and the ground node 306. At the output node 304, the switch-mode power supply 138 provides an output voltage ($V_{out}$) 314 and an output current ($I_{out}$) 316 to the load 134. As an example, the load 134 can be the amplifier 128, and the output voltage 314 can be the supply voltage 218, as shown in FIG. 2.

The ground node 306 couples the switching circuit 142 and the output capacitor 312 to a ground 318. At the ground node 306, the switch-mode power supply 138 accepts a ground voltage 320 (e.g., a reference voltage associated with the ground 318). The switch node 308 couples together the switching circuit 142 and the inductor 140. At the switch node 308, the switch-mode power supply 138 provides a voltage ($V_{SW}$) 322.

The inductor 140 is coupled between the switch node 308 and the output node 304. In other words, a first terminal 324-1 of the inductor 140 is coupled to the switching circuit 142 and a second terminal 324-2 of the inductor 140 is coupled to the load 134 and the output capacitor 312. In this manner, the inductor 140 is coupled between the switching circuit 142 and the load 134. With the inductor 140 directly connected to the output node 304, the switch-mode power supply 138 can provide a continuous output current 316 during the boost mode 148.

The switching circuit 142 is coupled to the input node 302, the network of flying capacitors and switches 144, the ground node 306, and the inductor 140. The switching circuit 142 includes multiple switches, which can be implemented using transistors. Example transistors include a metal-oxide-semiconductor field-effect transistor (MOSFET) (e.g., NMOSFET or PMOSFET), a junction field-effect transistor (JFET), a bipolar junction transistor (BJT), an insulated gate bipolar transistor (IGBT), and so forth.

In the depicted configuration, the switching circuit 142 includes switches 326-1, 326-2, 326-3, 326-4, and 326-5. The switching circuit 142 also includes nodes 328 and 330. The node 328 couples together the first switch 326-1, the second switch 326-2, and a first terminal 332-1 of the network of flying capacitors and switches 144. The node 330 couples together the third switch 326-3, the fourth switch 326-4, the fifth switch 326-5, and a second terminal 332-2 of the network of flying capacitors and switches 144.

The first switch 326-1 is coupled to the power source 132, the second switch 326-2, the fifth switch 326-5, and the first terminal 332-1 of the network of flying capacitors and switches 144. In other words, the first switch 326-1 is coupled between the input node 302 and the node 328. The second switch 326-2 is coupled to the first switch 326-1, the third switch 326-3, the inductor 140, and the first terminal 332-1 of the network of flying capacitors and switches 144. In other words, the second switch 326-2 is coupled between the node 328 and the switch node 308.

The third switch 326-3 is coupled to the second switch 326-2, the fourth switch 326-4, the fifth switch 326-5, the inductor 140, and the second terminal 332-2 of the network of flying capacitors and switches 144. In other words, the third switch 326-3 is coupled between the switch node 308 and the node 330. The fourth switch 326-4 is coupled to the third switch 326-3, the fifth switch 326-5, the output capacitor 312, the ground 318, and the second terminal 332-2 of the network of flying capacitors and switches 144. In other words, the fourth switch 326-4 is coupled between the node 330 and the ground node 306. The fifth switch 326-5 is coupled to the first switch 326-1, the fourth switch 326-4, the power source 132, and the second terminal 332-2 of the network of flying capacitors and switches 144. In other words, the fifth switch 326-5 is coupled between the input node 302 and the node 330.

States of the switches 326-1 to 326-5 of the switching circuit 142 are configured according to charging and discharging phases of the buck mode 146 or the boost mode 148. The switches 326-1 to 326-5 can be individually configured in a closed state or an open state. The closed state enables current to flow, and the open state disrupts the flow of current. Configurations of the switches 326-1 to 326-5 for the boost mode 148 are further described with respect to FIGS. 5-1 to 6-2.

The network of flying capacitors and switches 144 is coupled between the nodes 328 and 330. In particular, the first terminal 332-1 of the network of flying capacitors and switches 144 is coupled to the node 328, and the second terminal 332-2 of the network of flying capacitors and switches 144 is coupled to the node 330. The network of flying capacitors and switches 144 includes at least two flying capacitors and at least three switches.

In the depicted configuration, the switch-mode power supply 138 is implemented as a three-level buck regulator with an integrated boost regulator. The buck regulator is a three-level buck regulator as it can provide the voltage ($V_{SW}$) 322 at three different levels during the buck mode 146. Other switch-mode power supplies that provide continuous output current can have a separate boost regulator coupled to the three-level buck regulator. In such cases, the boost regulator can use different switches and/or capacitors than those of the three-level buck regulator. In contrast, the switch-mode power supply 138 of FIG. 3 includes an integrated boost regulator such that the switching circuit 142 and the network of flying capacitors and switches 144 implement both the three-level buck regulator and the integrated boost regulator. Also, the boost regulator is integrated by way of the network of flying capacitors and switches 144 being coupled to internal nodes of the switching circuit 142 (e.g., nodes 328 and 330).

A conversion ratio of the switch-mode power supply 138 is represented as a ratio of the voltage ($V_{SW}$) 322 to the input voltage (e.g., $V_{SW}:V_{in}$). In some implementations, the switch-mode power supply 138 can selectively operate as a multiply-by-two boost regulator that provides a 2:1 conversion ratio, as further described with respect to FIGS. 5-1 and 5-2, a multiply-by-three boost regulator that provides a 3:1 conversion ratio, as further described with respect to FIGS. 6-1 and 6-2, or generally a multiply-by-N boost regulator that provides an N:1 conversion ratio.

To realize the various conversion ratios, the network of flying capacitors and switches 144 uses switches to connect the flying capacitors in various configurations. As an example, the switches can connect the flying capacitors in a parallel configuration 334 or a series configuration 336. As such, the network of flying capacitors and switches 144 can dynamically provide different capacitances and therefore different voltages across the nodes 328 and 330 during the discharging phase of the boost mode 148. This enables the switch-mode power supply 138 to realize different conversion ratios, such as the 2:1 or 3:1 conversion ratio for the boost mode 148. This flexibility enables the switch-mode power supply 138 to provide power to a variety of components and applications, including average-power-tracking as described in FIG. 2. Example implementations of the network of flying capacitors and switches 144 are further described with respect to FIGS. 4-1 and 4-2.

Figures 1, 4:
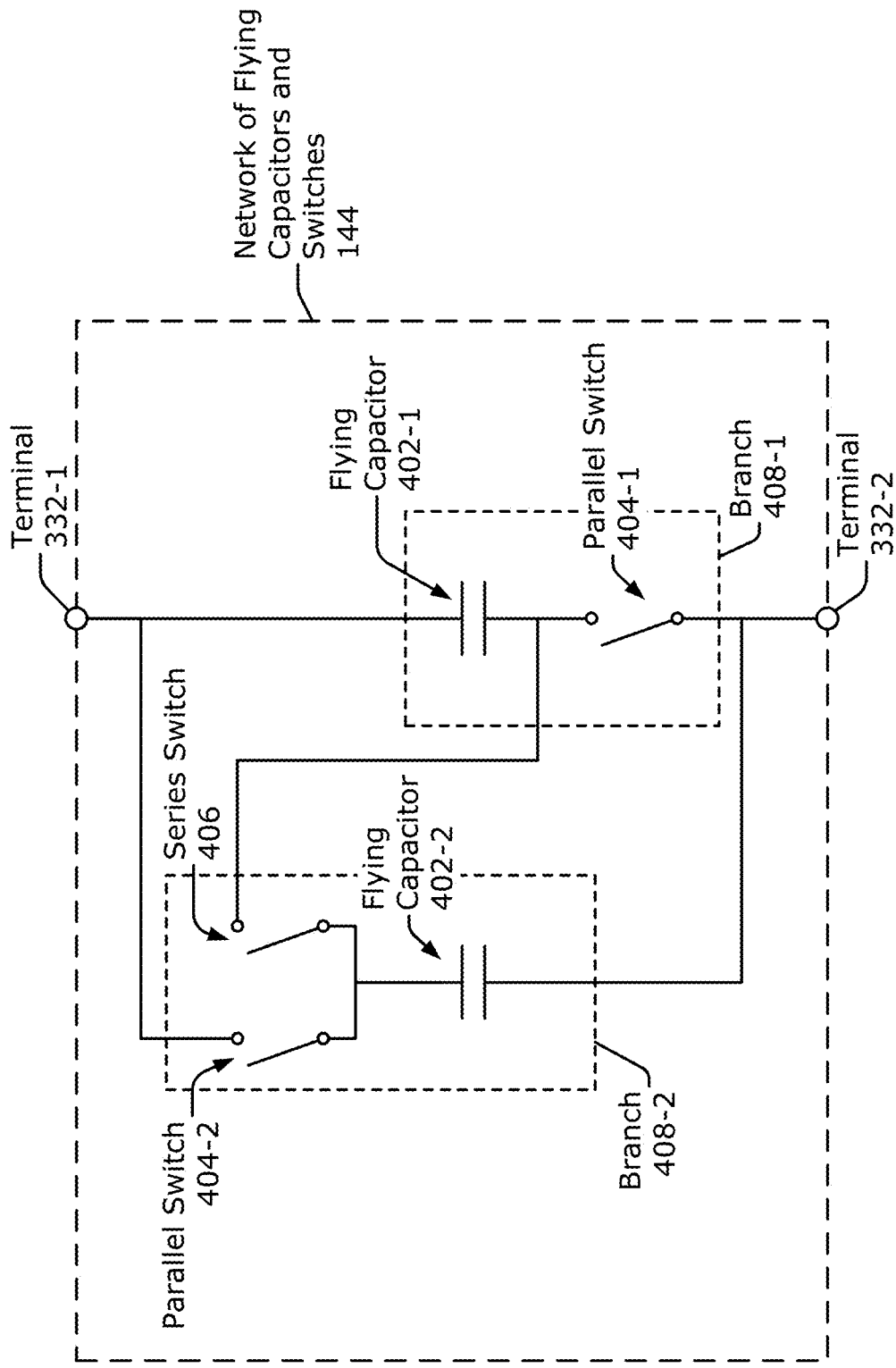
Figures 2, 4:
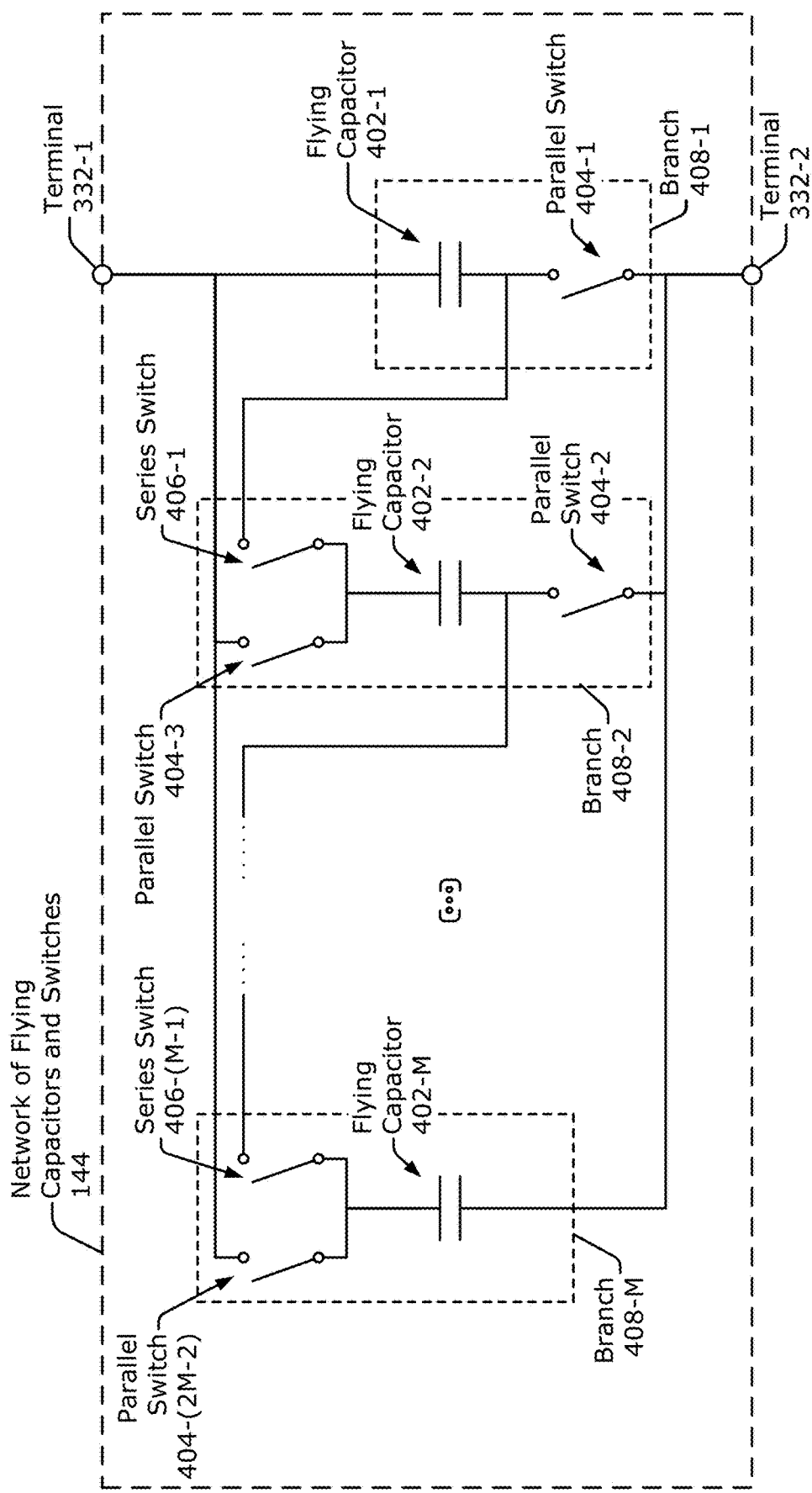

FIG. 4-1 illustrates an example implementation of the network of flying capacitors and switches 144. In the depicted configuration, the network of flying capacitors and switches 144 includes two flying capacitors 402-1 and 402-2 coupled between the terminals 332-1 and 332-2. During the boost mode 148, the switch-mode power supply 138 uses the switching circuit 142 to charge at least one the flying capacitors 402-1 and 402-2 during a charging phase and discharge at least one of the flying capacitors 402-1 and 404-2 during a discharging phase.

The network of flying capacitors and switches 144 also includes three switches, which are represented by switches 404-1, 404-2, and 406. The switches 404-1, 404-2, and 406 can be implemented using transistors. Example transistors include a metal-oxide-semiconductor field-effect transistor (MOSFET) (e.g., NMOSFET or PMOSFET), a junction field-effect transistor (JFET), a bipolar junction transistor (BJT), an insulated gate bipolar transistor (IGBT), and so forth.

The switches 404-1, 404-2, and 406 can selectively be in the open state or the closed state. While in the closed state, the switches 404-1 and 404-2 enable the flying capacitors 402-1 and 402-2 to be coupled together in parallel. As such, the switches 404-1 and 404-2 are referred to as parallel switches 404-1 and 404-2. The switch 406 enables the flying capacitors 402-1 and 402-2 to be coupled together in series while it is in the closed state. As such, the switch 406 is referred to as a series switch 406.

The flying capacitors 402-1 and 402-2, the parallel switches 404-1 and 404-2, and the series switch 406 are arranged to form two branches 408-1 and 408-2. Each branch 408-1 and 408-2 is coupled between the terminals 332-1 and 332-2 and includes one of the flying capacitors 402-1 or 402-2 and one of the parallel switches 404-1 or 404-2. For example, the branch 408-1 includes the flying capacitor 402-1 and the parallel switch 404-1. A first terminal of the flying capacitor 402-1 is coupled to the parallel switch 404-1, and the second terminal of the flying capacitor 402-2 is coupled to the terminal 332-1. The parallel switch 404-1 is coupled between the first terminal of the flying capacitor 402-1 and the terminal 332-2.

The branch 408-2 includes the flying capacitor 402-2, the parallel switch 404-2, and the series switch 406. A first terminal of the flying capacitor 402-2 is coupled to the terminal 332-2. A second terminal of the flying capacitor 402-2 is coupled to the parallel switch 404-2 and the series switch 406. The parallel switch 404-2 is coupled between the second terminal of the flying capacitor 402-2 and the terminal 332-1. The series switch 406 is coupled to the first terminal of the flying capacitor 402-1 and the second terminal of the flying capacitor 402-2. The series switch 406 is also coupled to the parallel switches 404-1 and 404-2.

To configure the network of flying capacitors and switches 144 according to the parallel configuration 334, the parallel switches 404-1 and 404-2 are in the closed state and the series switch 406 is in the open state. Accordingly, the flying capacitors 402-1 and 402-2 are connected in parallel between the terminals 332-1 and 332-2. The parallel configuration 334 enables voltages across the flying capacitors 402-1 and 402-2 to increase up to the input voltage ($V_{in}$) 216 during a charging phase of the switch-mode power supply 138. The parallel configuration 334 also enables the voltage across the terminals 330-1 and 330-2 to be approximately equal to the input voltage ($V_{in}$) 216 during a discharging phase of the switch-mode power supply 138

To configure the network of flying capacitors and switches 144 according to the series configuration 336, the parallel switches 404-1 and 404-2 are in the open state and the series switch 406 is in the closed state. Accordingly, the flying capacitors 402-1 and 402-2 are connected in series between the terminals 330-1 and 330-2. The series configuration 336 enables the voltage across the terminals 330-1 and 330-2 to be approximately equal to twice the input voltage ($V_{in}$) 216 during a discharging phase of the switch-mode power supply 138.

Using the network of flying capacitors and switches 144 shown in FIG. 4-1, the switch-mode power supply 138 can selectively provide a 2:1 or a 3:1 conversion ratio during the boost mode 148, as further described with respect to FIGS. 5-1 to 6-2. The switch-mode power supply 138 can be designed to support additional conversion ratios. In such cases, the network of flying capacitors and switches 144 can be modified to include additional branches 408, as further described with respect to FIG. 4-2.

FIG. 4-2 illustrates another example implementation of the network of flying capacitors and switches 144. In the depicted configuration, the network of flying capacitors and switches 144 includes flying capacitors 402-1, 402-2 . . . 402-M, where M represents a positive integer greater than two. The network of flying capacitors and switches 144 also includes parallel switches 404-1 to 404-(2M-2) and series switches 406-1 to 406-(M-1).

The flying capacitors 402-1 to 402-M, the parallel switches 404-1 to 404-(2M-2), and the series switches 406-1 to 406-(M-1) are arranged to form multiple branches 408-1 to 408-M. Each branch 408-1 to 408-M is coupled between the terminals 332-1 and 332-2 and includes one of the flying capacitors 402-1 to 402-M and at least one of the parallel switches 404-1 or 404-(2M-2).

The branch 408-1 of FIG. 4-2 is similar to the branch 408-1 of FIG. 4-1. In particular, the branch 408-1 includes the flying capacitor 402-1 and the parallel switch 404-1. The branch 408-M of FIG. 4-2 is similar to the branch 408-2 of FIG. 4-1. In particular, the branch 408-M includes the flying capacitor 402-M, the parallel switch 404-(2M-2), and the series switch 406-(M-1). The parallel switch 404-(2M-2) is coupled between the flying capacitor 402-M and the terminal 332-1. The series switch 406-(M-1) is coupled to the flying capacitor 402-M, the parallel switch 404-(2M-2), a flying capacitor 402 of a neighboring branch 408 (e.g., the flying capacitor 402-2), and the parallel switch 404 of the neighboring branch 408 (e.g., the parallel switch 404-2).

The branch 408-2 represents an inner branch that is coupled to two neighboring branches 408 (e.g., coupled to branch 408-1 and 408-M). In general, the network of flying capacitors and switches 144 includes M-2 inner branches having a similar architecture as branch 408-2. Each inner branch includes a flying capacitor 402, two parallel switches 404, and a series switch 406. For example, the branch 408-2 includes the flying capacitor 402-2, the parallel switches 404-2 and 404-3, and the series switch 406-1. The parallel switch 404-2 is coupled between the flying capacitor 402-2 and the terminal 332-2. The parallel switch 404-2 is also coupled to a series switch 406 of a neighboring branch 408, such as the series switch 406-(M-1) of branch 408-M. The parallel switch 404-3 is coupled between the flying capacitor 402-2 and the terminal 332-1. The series switch 406-1 is coupled to the flying capacitor 402-2, the parallel switch 404-3, the flying capacitor 402 of a neighboring branch 408 (e.g., the flying capacitor 402-1 of the branch 408-1), and the parallel switch 404 of the neighboring branch 408 (e.g., the parallel switch 404-1 of the branch 408-1).

To configure the network of flying capacitors and switches 144 of FIG. 4-2 according to the parallel configuration 334, the parallel switches 404-1 to 404-(2M-2) are in the closed state and the series switches 406-1 to 406-(M-1) are in the open state. Accordingly, the flying capacitors 402-1 to 402-M are connected in parallel between the terminals 332-1 and 332-2. The parallel configuration 334 enables voltages across the flying capacitors 402-1 to 402-M to increase up to the input voltage ($V_{in}$) 216 during a charging phase of the switch-mode power supply 138.

To configure the network of flying capacitors and switches 144 of FIG. 4-2 according to a series configuration 336, the parallel switches 404-1 to 404-(2M-2) are in the open state and the series switches 406-1 to 406-(M-1) are in the closed state. Accordingly, the flying capacitors 402-1 and 402-2 are connected in series between the terminals 332-1 and 332-2. The series configuration 336 enables the voltage across the terminals 330-1 and 330-2 to be approximately equal to M-times the input voltage ($V_{in}$) 216 during a discharging phase of the switch-mode power supply 138.

In general, the parallel configuration 334 connects at least two of the flying capacitors 402-1 to 402-M in parallel between the terminals 332-1 and 332-2, and the series configuration 336 connects at least two of the flying capacitors 402-1 to 402-M in series between the terminals 330-1 and 330-2. By using different quantities of the flying capacitors 402-1 to 402-M across the parallel and series configurations 334 and 336, the switch-mode power supply 138 can realize a variety of conversion ratios. For example, by utilizing S flying capacitors, where S is an integer that is between 2 and M, the switch-mode power supply 138 can provide a conversion ratio of (S+1):1.

Although adding additional branches 408 to the network of flying capacitors and switches 144 can increase a footprint of the switch-mode power supply 138 and increase the complexity of the network of flying capacitors and switches 144, this enables the switch-mode power supply 138 to operate at higher conversion ratios with better efficiency than a system that uses multiple boost regulators implemented in series to achieve approximately the same conversion ratio.

During the buck mode 146, at least one of the flying capacitors 402 of FIG. 4-1 or 4-2 can be configured as a decoupling capacitor. For example, the switches 404 and 406 of the network of flying capacitors and switches 144 and the switches 326-1 and 326-4 of the switching circuit 142 connect one or more of the flying capacitors 402 between the input node 302 and the ground node 306.

Alternatively, the switches 404 and 406 of the network of flying capacitors and switches 144 can be in the open state to disconnect the flying capacitors 402 from at least one of the terminals 332-1 or 332-2. In this way, the flying capacitors 402 are floating.

Figures 1, 5:
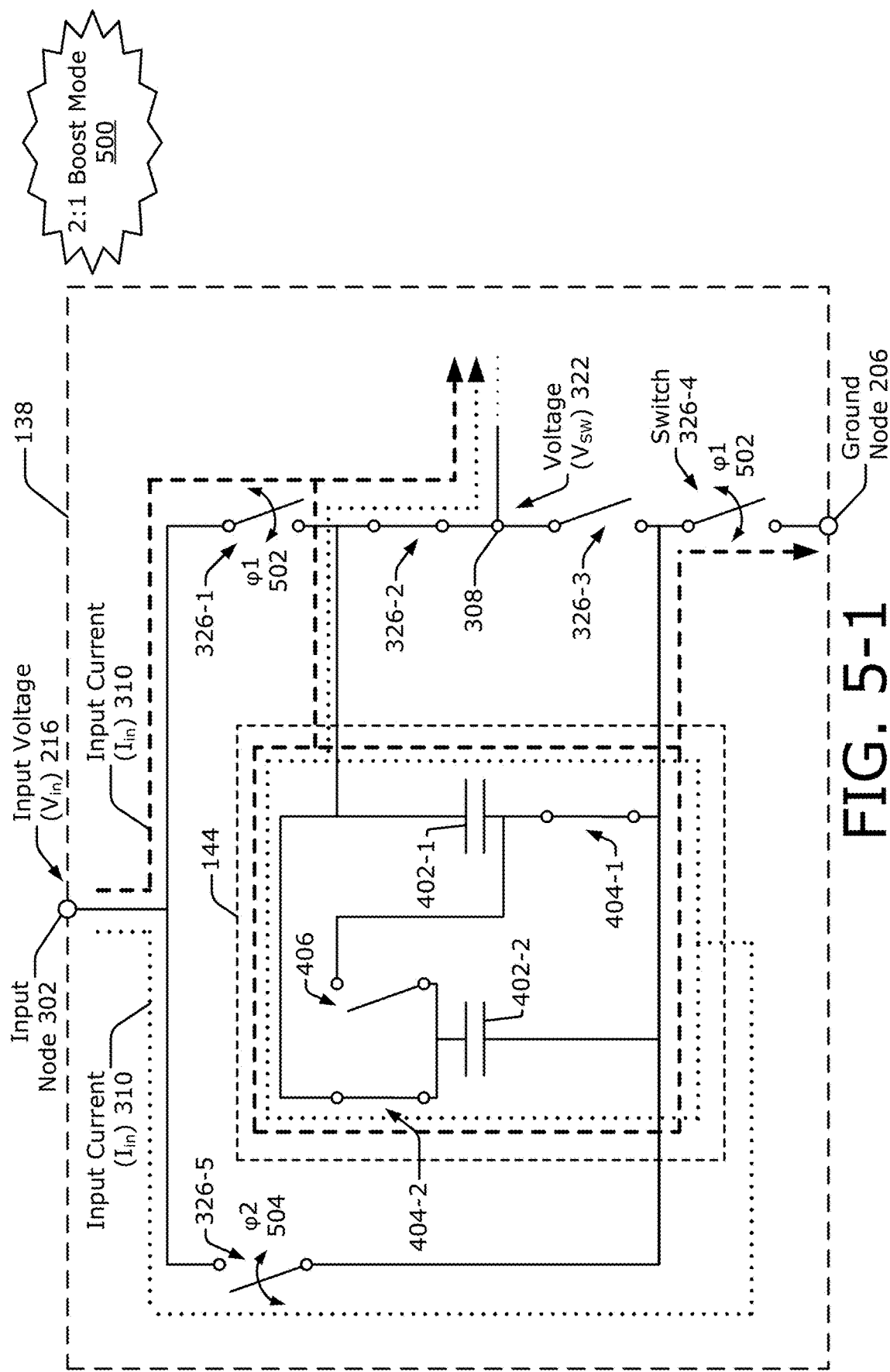
Figures 2, 5:
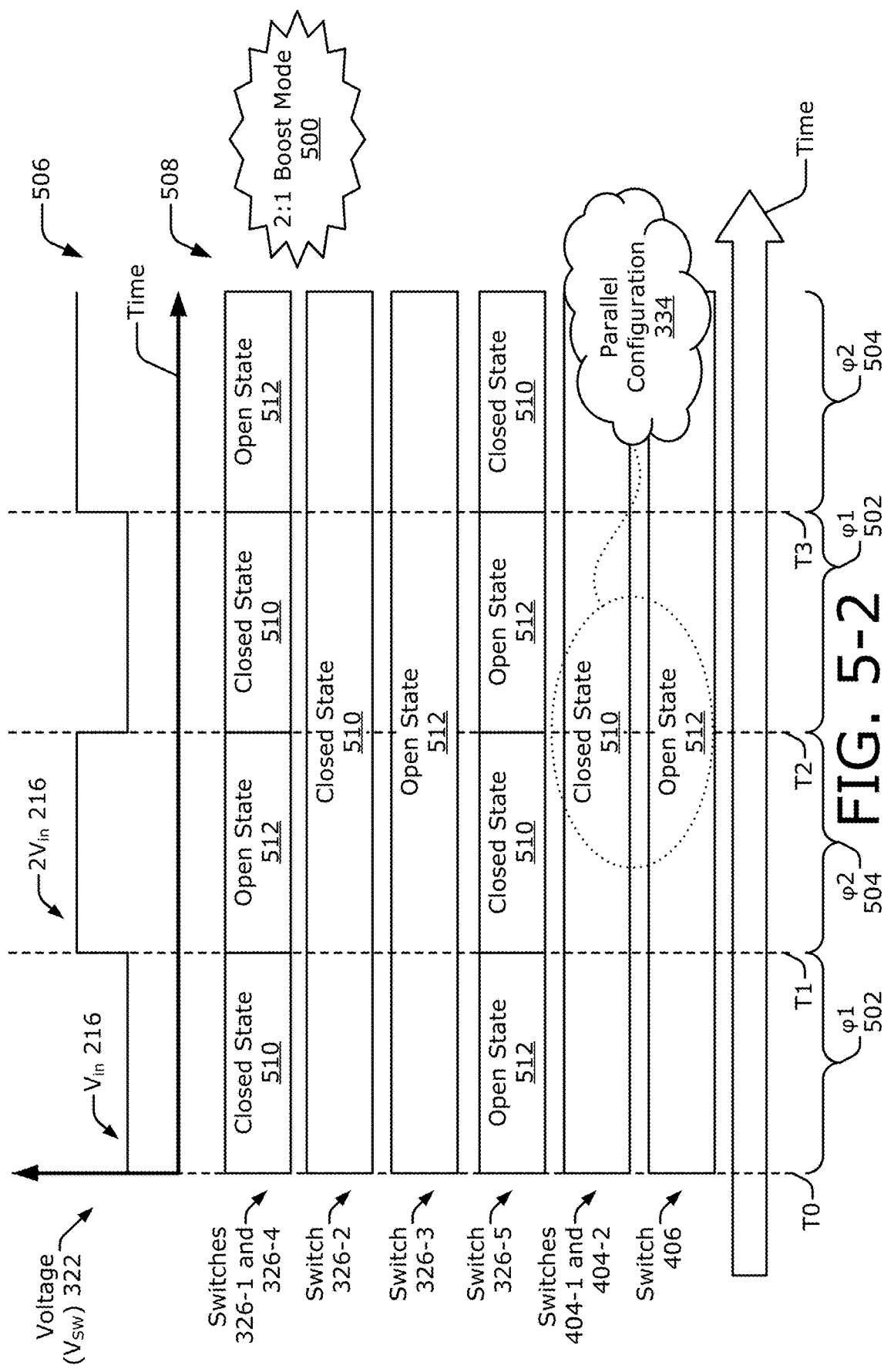

FIG. 5-1 illustrates example operation of the switch-mode power supply 138 for a 2:1 boost mode 500. The 2:1 boost mode 500 is a boost mode 148 that realizes a 2:1 conversion ratio in which the voltage ($V_{SW}$) 322 at the switch node 308 can be approximately equal to twice the input voltage ($V_{in}$) 216.

The 2:1 boost mode 500 has two phases: a charging phase (φ1) 502 (φ1 502) and a discharging phase (φ2) 504 (φ2 504). During the charging phase 502, the switching circuit 142 enables at least one of the flying capacitors 402-1 or 402-2 to be charged by the power source 132. Flow of the input current ($I_{in}$) 310 during the charging phase 502 is depicted by the dashed lines. The input current ($I_{in}$) 310 flows from the input node 302 to the switch node 308. The input current ($I_{in}$) 310 also flows from the input node 302 to the ground node 306 through the network of flying capacitors and switches 144.

During the discharging phase 504, the switching circuit 142 enables at least one of the flying capacitors 402-1 or 402-2 to be discharged. Flow of the input current ($I_{in}$) 310 during the discharging phase 504 is depicted by the dotted lines. The input current ($I_{in}$) 310 flows from the input node 302 to the switching node 308 through the network of flying capacitors and switches 144.

For the 2:1 boost mode 500, the network of flying capacitors and switches 144 can be configured in the parallel configuration 334 during the charging phase 502 and the discharging phase 504. In this case, the flying capacitors 402-1 and 402-2 are charged and discharged in the parallel configuration 334. Alternatively, one of the flying capacitors 402-1 or 402-2 can be floating such that the other flying capacitor 402-1 or 402-2 is charged and discharged. The states of the switches 326-1 to 326-5, 404-1, 404-2, and 406 during the charging phase 502 and the discharging phase 504 are further described with respect to FIG. 5-2.

FIG. 5-2 illustrates an example graph 506 of the voltage 322 at the switch node 308 and an example state diagram 508 of the switches 326-1 to 326-5, 404-1, 404-2, and 406 for the 2:1 boost mode 500. In the graph 506 and the state diagram 508, time progresses from left to right. As time progresses, the switch-mode power supply 138 alternates between the charging phase (φ1) 502 and the discharging phase (φ2) 504. In FIG. 5-2, the durations of the charging phase 502 and the discharging phase 504 are shown to be relatively the same to represent a 50% duty cycle. However, operations of the switch-mode power supply 138 can utilize other duty cycles in which the duration of the charging phase 502 is greater than or less than the duration of the discharging phase 504.

Between time T0 and time T1, the switch-mode power supply 138 is configured according to the charging phase 502. In particular, the switches 326-1, 326-2, and 326-4 are in a closed state 510. Also, the switches 326-5 and 326-3 are in an open state 512. The network of flying capacitors and switches 144 is in the parallel configuration 334. Based on the parallel configuration 334, the parallel switches 404-1 and 402-2 are in the closed state 510 and the series switch 406 is in the open state 512. The voltage ($V_{SW}$) 322 at the switch node 308 is approximately equal to the input voltage ($V_{in}$) 216.

Between time T1 and time T2, the switch-mode power supply 138 is configured according to the discharging phase 504. In particular, the switches 326-1, 326-3, and 326-4 are in the open state 512. Also, the switches 326-2 and 326-5 are in the closed state 510. The network of flying capacitors and switches 144 is in the parallel configuration 334. For example, the parallel switches 404-1 and 404-2 are in the closed state 510 and the series switch 406 is in the open state 512. The voltage ($V_{SW}$) 322 at the switch node 308 is approximately equal to twice the input voltage ($V_{in}$) 216.

Figures 1, 6:
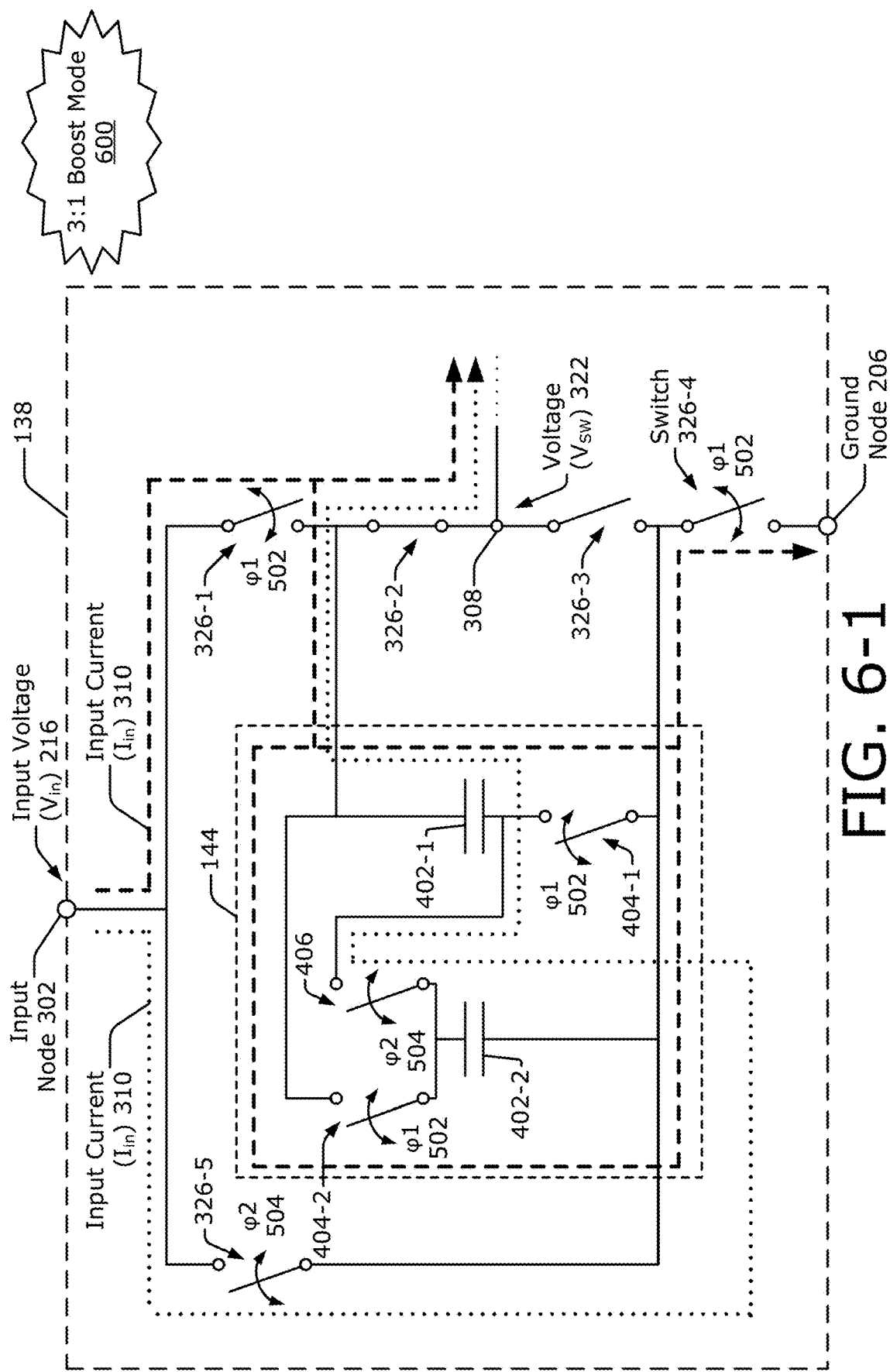
Figures 2, 6:
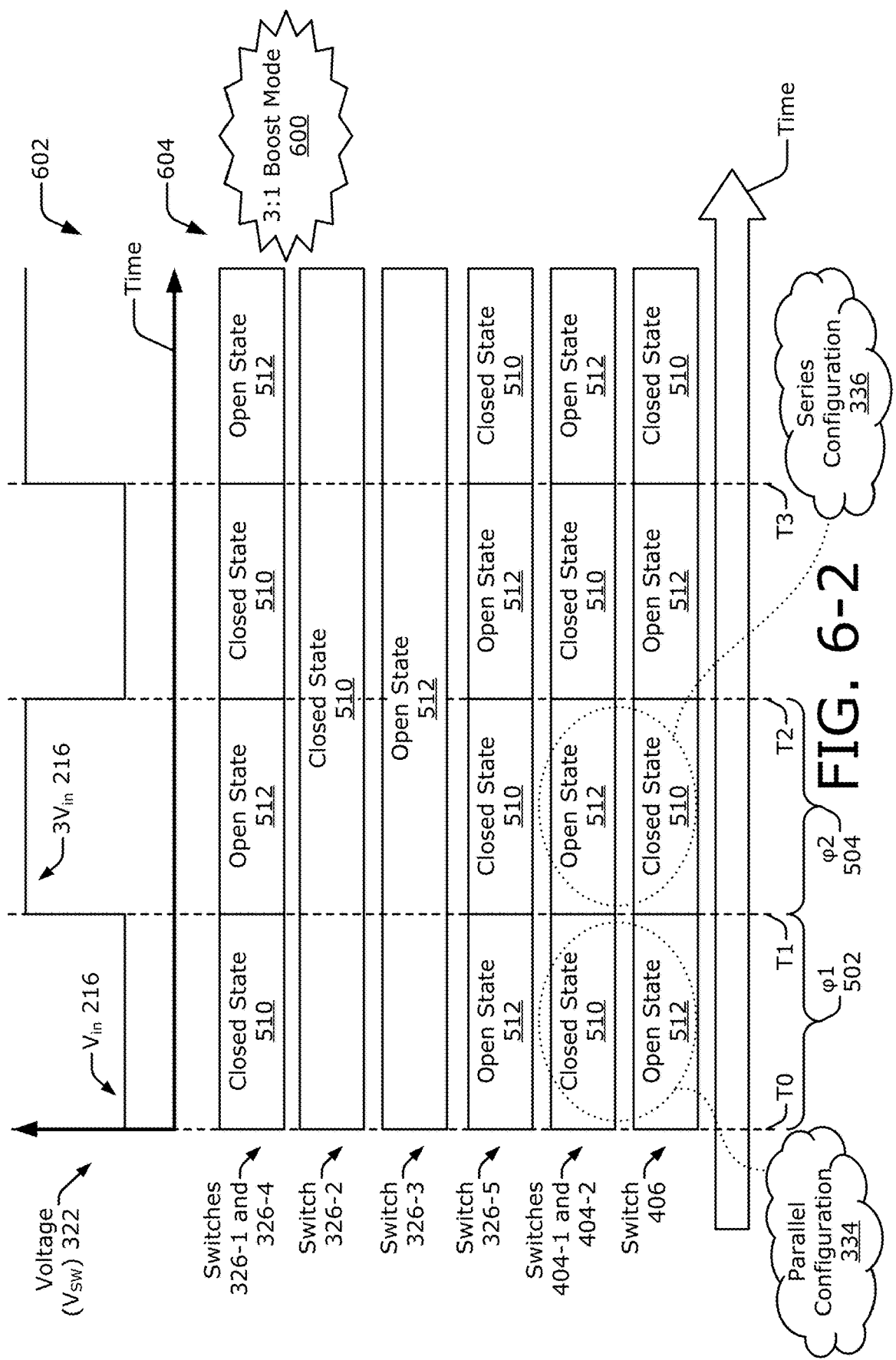

FIG. 6-1 illustrates example operation of the switch-mode power supply 138 for a 3:1 boost mode 600. The 3:1 boost mode 600 is a boost mode 148 that realizes a 3:1 conversion ratio in which the voltage ($V_{SW}$) 322 at the switch node 308 can be approximately equal to three times the input voltage ($V_{in}$) 216.

Similar to the 2:1 boost mode 500, the 3:1 boost mode 600 also has the charging phase (φ1) 502 and the discharging phase (φ2) 504. During the charging phase 502, the switching circuit 142 enables at least two of the flying capacitors 402 to be charged by the power source 132. Flow of the input current ($I_{in}$) 310 during the charging phase 502 is depicted by the dashed lines. The input current ($I_{in}$) 310 flows from the input node 302 to the switch node 308. The input current ($I_{in}$) 310 also flows from the input node 302 to the ground node 306 through the network of flying capacitors and switches 144.

During the discharging phase 504, the switching circuit 142 enables at least two of the flying capacitors 402 to be discharged. Flow of the input current ($I_{in}$) 310 during the discharging phase 504 is depicted by the dotted lines. The input current ($I_{in}$) 310 flows from the input node 302 to the switching node 308 through the network of flying capacitors and switches 144.

For the 3:1 boost mode 600, the network of flying capacitors and switches 144 can be configured in the parallel configuration 334 during the charging phase 502. In this case, the flying capacitors 402-1 and 402-2 are charged in the parallel configuration 334. During the discharging phase 504, the flying capacitors 402-1 and 402-2 are discharged in the series configuration 336. The states of the switches 326-1 to 326-5, 404-1, 404-2, and 406 during the charging phase 502 and the discharging phase 504 are further described with respect to FIG. 6-2.

FIG. 6-2 illustrates an example graph 602 of the voltage 322 at the switch node 308 and an example state diagram 604 of the switches 326-1 to 326-5, 404-1, 404-2, and 406 for the 3:1 boost mode 600. In the graph 506 and the state diagram 508, time progresses from left to right. As time progresses, the switch-mode power supply 138 alternates between the charging phase (φ1) 502 and the discharging phase (φ2) 504. In FIG. 6-2, the durations of the charging phase 502 and the discharging phase 504 are shown to be relatively the same to represent a 50% duty cycle. However, operations of the switch-mode power supply 138 can utilize other duty cycles in which the duration of the charging phase 502 is greater than or less than the duration of the discharging phase 504.

Between time T0 and time T1, the switch-mode power supply 138 is configured according to the charging phase 502. In particular, the switches 326-1, 326-2, and 326-4 are in the closed state 510. Also, the switches 326-5 and 326-3 are in the open state 512. The network of flying capacitors and switches 144 is in the parallel configuration 334. Based on the parallel configuration 334, the parallel switches 404-1 and 402-2 are in the closed state 510 and the series switch 406 is in the open state 512. The voltage ($V_{SW}$) 322 at the switch node 308 is approximately equal to the input voltage ($V_{in}$) 216.

Between time T1 and time T2, the switch-mode power supply 138 is configured according to the discharging phase 504. In particular, the switches 326-1, 326-3, and 326-4 are in the open state 512. Also, the switches 326-2 and 326-5 are in the closed state 510. The network of flying capacitors and switches 144 is in the series configuration 336. For example, the parallel switches 404-1 and 404-2 are in the open state 512 and the series switch 406 is in the closed state 510.

In general, the operation of the switching circuit 142 for the 2:1 boost mode 500 and the 3:1 boost mode 600 can be the same. The configuration of the network of flying capacitors and switches 144, however, is different between the 2:1 boost mode 500 and the 3:1 boost mode 600 during at least the discharging phase 504.

The techniques described above can be extended to the switch-mode power supply 138 of FIG. 4-2 with M flying capacitors 402-1 to 402-M. For example, to operate the switch-mode power supply 138 of FIG. 4-2 according to an N:1 boost mode, the switch-mode power supply 138 charges at least N−1 of the flying capacitors 402-1 to 402-M in the parallel configuration 334 during the charging phase 502 and discharges the N−1 flying capacitors 402-1 to 402-M in the series configuration 336 during the discharging phase 504.

The switch-mode power supply 138 can dynamically switch between different conversion ratios. For example, the switch-mode power supply 138 can switch between the 2:1 boost mode 500 and the 3:1 boost mode 600. Consider that the switch-mode power supply 138 operates according to the charging phase 502 of FIG. 5-2 or 6-2 for a first time interval and operates according to the discharging phase 504 of FIG. 5-2 for a second time interval. This enables the switch-mode power supply 138 to realize the 2:1 conversion ratio. To transition to the 3:1 conversion ratio, the switch-mode power supply operates according to the charging phase 502 of FIG. 5-2 or 6-2 for a third time interval and operates according to the discharging phase 504 of FIG. 6-2 for a fourth time interval.

During some loading conditions, the switch-mode power supply 138 can optionally use resonant charging to charge the flying capacitors 402 during the charging phase 502. Resonant charging can be performed using the parasitic inductance between the node 328 and the flying capacitors 402. For resonant charging, the flying capacitors 402 are charged during a positive half-cycle of the input current 310 and disconnected during a negative half-cycle of the input current 310. To disconnect the flying capacitors 402 during the negative half-cycle of the input current 310, the switch 326-4 can transition from the closed state 510 to the open state 512. Resonant charging reduces switching losses within the switch-mode power supply 138 by enabling the switch 326-4 to transition while the input current 310 is relatively low.

To control an operation of the switch 326-4 for resonant charging, the switch-mode power supply 138 can include a control circuit. The control circuit can sense the input current 310 directly or indirectly and trigger the switch 326-4 to appropriately change states based on the input current 310. In one implementation, the control circuit includes a current sensor to directly measure the input current 310. In another implementation, the control circuit includes a timer and a voltage sensor. Upon expiration of the timer, the switch 326-4 transitions between the closed state 510 and the open state 512. To adjust a duration of the timer and account for variations caused by temperature and voltage, the voltage sensor measures a voltage at one of the terminals of the switch 326-4. If the switch 326-4 experiences a significant voltage spike during the transition, the voltage sensor adjusts the duration of the timer to reduce the voltage spike.

Figure 7:
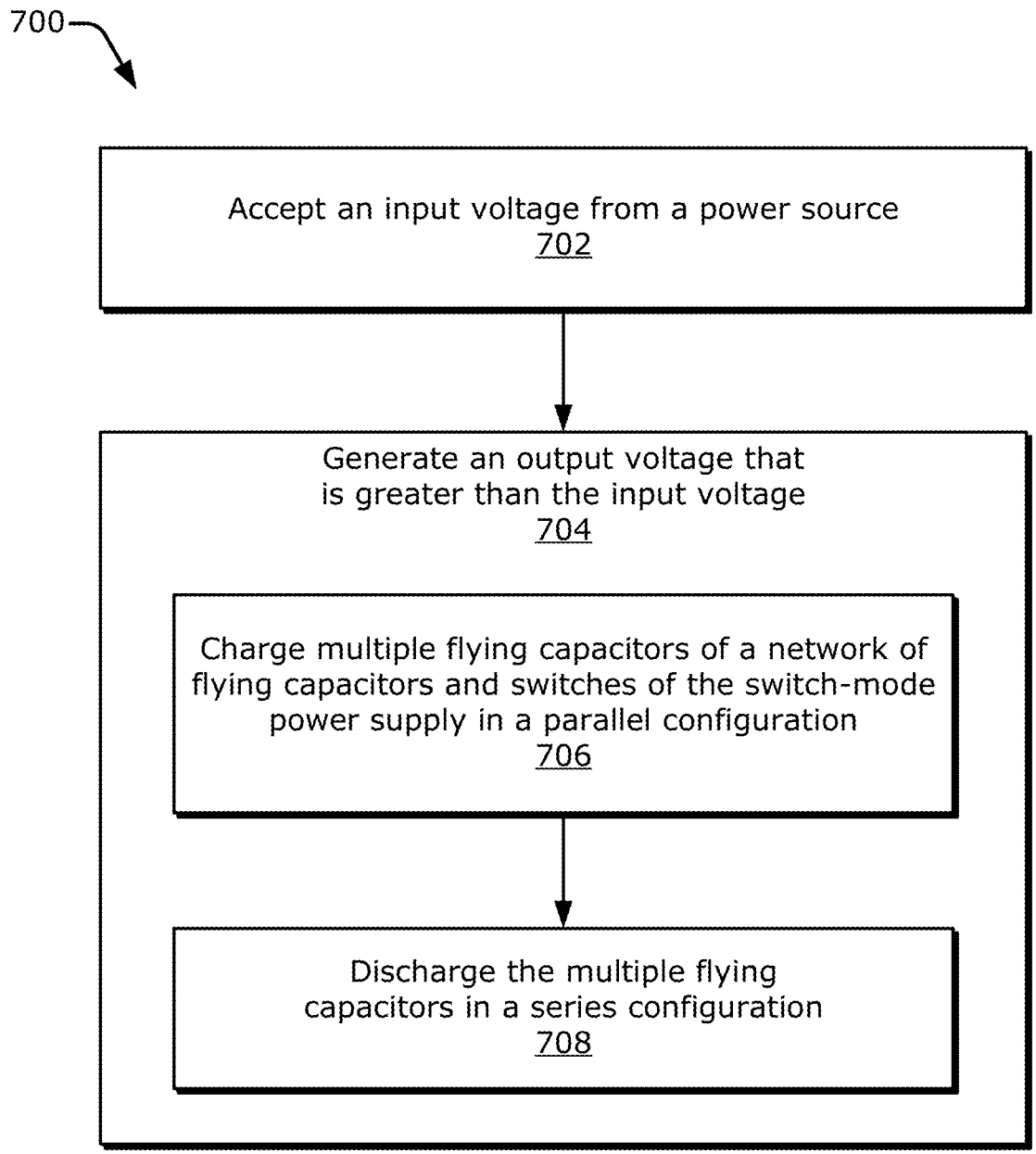
FIG. 7 is a flow diagram illustrating an example process for operating a switch-mode power supply with a network of flying capacitors and switches.

FIG. 7 is a flow diagram illustrating an example process 700 for operating a switch-mode power supply with a network of flying capacitors and switches. The process 700 is described in the form of a set of blocks 702-708 that specify operations that can be performed. However, operations are not necessarily limited to the order shown in FIG. 7 or described herein, for the operations may be implemented in alternative orders or in fully or partially overlapping manners. Also, more, fewer, and/or different operations may be implemented to perform the process 700, or an alternative process. Operations represented by the illustrated blocks of the process 700 may be performed by a power transfer circuit 136 (e.g., of FIG. 1) or a switch-mode power supply 138 (e.g., of FIG. 138). More specifically, the operations of the process 700 may be performed, at least in part, by a switching circuit 142 and a network of flying capacitors and switches 144 as shown in FIG. 3.

At block 702, an input voltage is accepted from a power source. For example, the switch-mode power supply 138 accepts the input voltage ($V_{in}$) 216 from the power source 132, as shown in FIG. 3.

At block 704, an output voltage that is greater than the input voltage is generated. For example, the switch-mode power supply 138 operates according to the boost mode 148 to generate an output voltage ($V_{out}$) 314 that is greater than the input voltage.

At block 706, multiple flying capacitors of a network of flying capacitors and switches of the switch-mode power supply are charged in a parallel configuration. For example, the switch-mode power supply 138 charges multiple flying capacitors 402 of the network of flying capacitors and switches 144 in the parallel configuration 334, as shown in FIGS. 5-2 and 6-2. To charge the flying capacitors 402, the switching circuit 142 enables the input current 310 to flow from the input node 302 to the ground node 306 through the network of flying capacitors and switches 144 during the charging phase 502, as shown in FIGS. 5-1 and 6-1. The switches 404 and 406 within the network of flying capacitors and switches 144 connect at least two of the flying capacitors 402 in parallel between the first terminal 332-1 and the second terminal 332-2 of the network of flying capacitors and switches 144.

At block 708, the multiple flying capacitors are discharged in a series configuration. For example, the switch-mode power supply 138 discharges the multiple flying capacitors 402 of the network of flying capacitors and switches 144 in the series configuration 336, as shown in FIG. 6-2. To discharge the flying capacitors 402, the switching circuit 142 enables current to flow from the input node 302 to the switch node 308 through the network of flying capacitors and switches 144 during the discharging phase 504, as shown in FIG. 6-1. The switches 404 and 406 within the network of flying capacitors and switches 144 connect at least two of the flying capacitors 402 that were previously charged in series between the first terminal 332-1 and the second terminal 332-2 of the network of flying capacitors and switches 144. In this way, the switch-mode power supply can realize a 3:1 conversion ratio.

Some aspects are described below.

Aspect 1: An apparatus comprising:
a switch-mode power supply comprising:
an inductor;
a switching circuit coupled to the inductor; and
a network of flying capacitors and switches coupled to the switching circuit, the network of flying capacitors and switches comprising:
at least two flying capacitors; and
multiple switches coupled to the at least two flying capacitors, the multiple switches configured to selectively:
connect the at least two flying capacitors in parallel between a first terminal of the network of flying capacitors and switches and a second terminal of the network of flying capacitors and switches; or
connect the at least two flying capacitors in series between the first terminal and the second terminal.

Aspect 2: The apparatus of aspect 1, wherein the switching circuit is configured to:
be coupled to a power source and a ground; and
selectively:
connect the inductor to the power source, connect the first terminal of the network of flying capacitors and switches to the power source, and connect the second terminal of the network of flying capacitors and switches to the ground based on the multiple switches connecting the at least two flying capacitors in parallel; or
connect the first terminal of the network of flying capacitors and switches to the inductor and connect the second terminal of the network of flying capacitors and switches to the power source based on the multiple switches connecting the at least two flying capacitors in series.

Aspect 3: The apparatus of aspect 1 or 2, wherein:
the inductor is configured to be coupled to a load; and
the switch-mode power supply is configured to provide a continuous output current through the inductor to the load.

Aspect 4: The apparatus of any preceding aspect, wherein:
the switch-mode power supply is configured to operate according to a boost mode, the boost mode comprising a charging phase and a discharging phase; and
the multiple switches are selectively configured to:
connect the at least two flying capacitors in parallel according to the charging phase; and
connect the at least two flying capacitors in series according to the discharging phase.

Aspect 5: The apparatus of aspect 4, wherein the switch-mode power supply is configured to:
provide, at a terminal of the inductor that is coupled to the switching circuit, a voltage that is at substantially a same level as an input voltage according to the charging phase; and
provide, at the terminal of the inductor, the voltage that is at another level that is approximately three times the input voltage according to the discharging phase.

Aspect 6: The apparatus of aspect 4 or 5, wherein the switch-mode power supply is configured to:
accept an input voltage from a power source; and
generate, according to the boost mode, an output voltage that is greater than the input voltage.

Aspect 7: The apparatus of aspect 6, wherein the switch-mode power supply is configured to selectively:
operate according to the boost mode; or
operate according to a buck mode to cause the output voltage to be less than the input voltage.

Aspect 8: The apparatus of aspect 7, wherein the multiple switches are configured to disconnect, based on the buck mode, each capacitor of the at least two flying capacitors from at least one of the first terminal of the network of flying capacitors and switches or the second terminal of the network of flying capacitors and switches.

Aspect 9: The apparatus of aspect 7, wherein the multiple switches are configured to enable, based on the buck mode, at least one flying capacitor of the at least two flying capacitors to be connected between the first terminal of the network of flying capacitors and switches and the second terminal of the network of flying capacitors and switches.

Aspect 10: The apparatus of any one of aspects 4-9, wherein:
the boost mode comprises a first boost mode associated with a first conversion ratio; and
the switch-mode power supply is configured to operate according to a second boost mode associated with a second conversion ratio.

Aspect 11: The apparatus of aspect 10, wherein:
the second boost mode comprises another charging phase and another discharging phase; and the switch-mode power supply is configured to:
provide, at a terminal of the inductor, a voltage that is at substantially the same level as an input voltage according to the other charging phase; and
provide, at the terminal of the inductor, the voltage that is at another level that is approximately two times the input voltage according to the other discharging phase.

Aspect 12: The apparatus of aspect 10 or 11, wherein:
the first conversion ratio comprises a 3:1 conversion ratio; and
the second conversion ratio comprises a 2:1 conversion ratio.

Aspect 13: The apparatus of any preceding aspect, wherein the switching circuit comprises:
a first switch coupled to the first terminal of the network of flying capacitors and switches, the first switch configured to be coupled to a power source;
a second switch coupled to the first switch, the inductor, and the first terminal of the network of flying capacitors and switches;
a third switch coupled to the second switch, the inductor, and the second terminal of the network of flying capacitors and switches;
a fourth switch coupled to the third switch and the second terminal of the network of flying capacitors and switches, the fourth switch configured to be coupled to a ground; and
a fifth switch coupled to the first switch and the second terminal of the network of flying capacitors and switches, the fifth switch configured to be coupled to the power source.

Aspect 14: The apparatus of aspect 13, wherein:
the second switch is configured to be in a closed state to connect the first terminal of the network of flying capacitors and switches to the inductor;
the third switch is configured to be in an open state;
the first switch and the fourth switch are configured to be in the closed state and the fifth switch is configured to be in the open state to enable the at least two flying capacitors to be charged; and
the first switch and the fourth switch are configured to be in the open state and the fifth switch is configured to be in the closed state to enable the at least two flying capacitors to be discharged.

Aspect 15: The apparatus of aspect 13 or 14, wherein:
the at least two flying capacitors comprises a first flying capacitor and a second flying capacitor; and
the multiple switches comprises:
a first switch coupled to a first terminal of the first flying capacitor and a first terminal of the second flying capacitor;
a second switch coupled between a second terminal of the first flying capacitor and a second terminal of the second flying capacitor; and
a third switch coupled between the first terminal of the first flying capacitor and the second terminal of the second flying capacitor.

Aspect 16: The apparatus of any preceding aspect, wherein the switch-mode power supply comprises a three-level buck converter with an integrated boost regulator.

Aspect 17: The apparatus of any preceding aspect, further comprising:
at least one antenna; and
a wireless transceiver coupled to the at least one antenna, the wireless transceiver configured to accept power from the switch-mode power supply.

Aspect 18: The apparatus of aspect 17, further comprising:
an average-power-tracking module, wherein:
the wireless transceiver comprises a power amplifier configured to accept a supply voltage from the switch-mode power supply; and
the average-power-tracking module is configured to adjust a voltage level of the supply voltage.

Aspect 19: An apparatus comprising:
a switch-mode power supply configured to be coupled to a power source, the switch-mode power supply comprising:
inductance means for storing energy;
capacitance means for storing energy;
first switching means for connecting the inductor means and the capacitance means to the power source and alternating between charging and discharging the capacitance means; and
second switching means for alternating between connecting the capacitance means in a parallel configuration and connecting the capacitance means in a series configuration.

Aspect 20: The apparatus of aspect 19, wherein:
the switch-mode power supply is configured to accept an input voltage from the power source; and
the switch-mode power supply is configured to provide, at a terminal of the inductance means, a voltage that is approximately three times the input voltage based on the second switching means connecting the capacitance means in the series configuration.

Aspect 21: The apparatus of aspect 19 or 20, wherein the switch-mode power supply is configured to provide at least two conversion ratios during a boost mode.

Aspect 22: The apparatus of aspect 21, wherein:
the at least two conversion ratios comprises a first conversion ratio and a second conversion ratio; and
the second switching means is configured to selectively:
connect the capacitance means in the parallel configuration while the first switching means enables the capacitance means to be charged and discharged to provide the first conversion ratio; or
alternate between connecting the capacitance means in the parallel configuration and the series configuration to provide the second conversion ratio.

Aspect 23: A method for operating a switch-mode power supply, the method comprising:
accepting an input voltage from a power source; and
generating an output voltage that is greater than the input voltage, the generating comprising:
charging multiple flying capacitors of a network of flying capacitors and switches of the switch-mode power supply in a parallel configuration; and
discharging the multiple flying capacitors in a series configuration.

Aspect 24: The method of aspect 23, wherein the charging the multiple flying capacitors comprises:
connecting a first terminal of the network of flying capacitors and switches of the switch-mode power supply to a power source and an inductor of the switch-mode power supply; and
connecting a second terminal of the network of flying capacitors and switches to a ground.

Aspect 25: The method of aspect 24, wherein the discharging the multiple flying capacitors comprises:
connecting the second terminal of the network of flying capacitors and switches to the power source; and connecting the first terminal of the network of flying capacitors and switches to the inductor.

Aspect 26: The method of any one of aspects 23-25, further comprising, selectively:
providing a first conversion ratio based on alternating between the charging of the multiple flying capacitors in the parallel configuration and the discharging of the multiple flying capacitors in the series configuration; or
providing a second conversion ratio based on charging and discharging the multiple flying capacitors in the parallel configuration or charging and discharging one capacitor of the multiple flying capacitors.

Aspect 27: An apparatus comprising:
a switch-mode power supply comprising:
an inductor;
a switching circuit coupled to the inductor and configured to couple a power source to the inductor; and
a network of flying capacitors and switches coupled to the switching circuit,
the switch-mode power supply configured to:
operate according to a boost mode;
generate a continuous output current that passes through the inductor based on the switching circuit coupling the power source to the inductor; and
provide at least two conversion ratios by using multiple switches of the network of flying capacitors and switches to connect multiple flying capacitors of the network of flying capacitors in at least two configurations to the switching circuit.

Aspect 28: The apparatus of aspect 27, wherein the at least two conversion ratios comprise a group of two or more of the following:
a 2:1 conversion ratio;
a 3:1 conversion ratio; or
a 4:1 conversion ratio.

Aspect 29: The apparatus of aspect 27 or 28, wherein the switch-mode power supply is selectively configured to operate according to the boost mode or a buck mode.

Aspect 30: The apparatus of any one of aspects 27-29, wherein:
the multiple flying capacitors of the network of flying capacitors and switches comprises at least two flying capacitors; and
the multiple switches of the network of flying capacitors and switches comprises at least three switches configured to selectively connect the at least two flying capacitors in a parallel configuration of the at least two configurations or a series configuration of the at least two configurations.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:
1. An apparatus comprising:
a switch-mode power supply configured to accept an input voltage from a power source and to selectively operate in a boost mode wherein an output voltage is greater than the input voltage or in a buck mode wherein the output voltage is less than the input voltage, the switch-mode power supply comprising:
an inductor;
a switching circuit comprising:
a first switch configured to be coupled to the power source;
a second switch;
a third switch; and
a fourth switch configured to be coupled to a ground, wherein:
the second switch is coupled between the first switch and the third switch,
the third switch is coupled between the second switch and the fourth switch, and
the inductor is coupled to a first node that is coupled between the second switch and the third switch; and
a network of flying capacitors and switches coupled to the switching circuit, the network of flying capacitors and switches comprising:
a first terminal coupled to a second node that is coupled between the first switch and the second switch, with neither the first switch nor the second switch coupled between the first terminal and the second node;
a second terminal coupled to a third node that is coupled between the third switch and the fourth switch, with neither the third switch nor the fourth switch coupled between the second terminal and the third node;
at least two flying capacitors; and
multiple switches coupled to the at least two flying capacitors, the multiple switches configured to selectively:
connect the at least two flying capacitors in parallel between the first terminal of the network of flying capacitors and switches and the second terminal of the network of flying capacitors and switches; or
connect the at least two flying capacitors in series between the first terminal and the second terminal;
wherein, when in the buck mode, the multiple switches are configured to disconnect each capacitor of the at least two flying capacitors from at least one of the first terminal of the network of flying capacitors and switches or the second terminal of the network of flying capacitors and switches; and
wherein, when in the boost mode, the multiple switches are selectively configured to connect the at least two flying capacitors in parallel according to a charging phase and connect the at least two flying capacitors in series according to a discharging phase.

2. The apparatus of claim 1, wherein the switching circuit is configured to selectively:
connect the inductor to the power source, connect the first terminal of the network of flying capacitors and switches to the power source, and connect the second terminal of the network of flying capacitors and switches to the ground based on the multiple switches connecting the at least two flying capacitors in parallel; or connect the first terminal of the network of flying capacitors and switches to the inductor using the second switch and connect the second terminal of the network of flying capacitors and switches to the power source using a fifth switch of the switching circuit based on the multiple switches connecting the at least two flying capacitors in series, the fifth switch coupled between the first switch and the third node that is coupled between the third switch and the fourth switch.

3. The apparatus of claim 1, wherein:
the inductor is configured to be coupled to a load; and
the switch-mode power supply is configured to provide a continuous output current through the inductor to the load.

4. The apparatus of claim 1, wherein the switch-mode power supply is configured to:
provide, at a terminal of the inductor that is coupled to the switching circuit, a voltage that is at substantially a same level as the input voltage according to the charging phase; and
provide, at the terminal of the inductor, the voltage that is at another level that is approximately three times the input voltage according to the discharging phase.

5. The apparatus of claim 1, wherein the multiple switches are configured to enable, based on the buck mode, at least one flying capacitor of the at least two flying capacitors to be connected between the first terminal of the network of flying capacitors and switches and the second terminal of the network of flying capacitors and switches.

6. The apparatus of claim 1, wherein:
the boost mode comprises a first boost mode associated with a first conversion ratio; and
the switch-mode power supply is configured to selectively operate according to a second boost mode associated with a second conversion ratio.

7. The apparatus of claim 6, wherein:
the second boost mode comprises another charging phase and another discharging phase; and
the switch-mode power supply is configured to:
provide, at a terminal of the inductor, a voltage that is at substantially a same level as the input voltage according to the other charging phase; and
provide, at the terminal of the inductor, the voltage that is at another level that is approximately two times the input voltage according to the other discharging phase.

8. The apparatus of claim 6, wherein:
the first conversion ratio comprises a 3:1 conversion ratio; and
the second conversion ratio comprises a 2:1 conversion ratio.

9. An apparatus comprising:
a switch-mode power supply configured to selectively operate in a boost mode or in a buck mode, the switch-mode power supply comprising:
an inductor;
a switching circuit coupled to the inductor; and
a network of flying capacitors and switches coupled to the switching circuit, the network of flying capacitors and switches comprising:
at least two flying capacitors; and
multiple switches coupled to the at least two flying capacitors, the multiple switches configured to selectively:
connect the at least two flying capacitors in parallel between a first terminal of the network of flying capacitors and switches and a second terminal of the network of flying capacitors and switches; or
connect the at least two flying capacitors in series between the first terminal and the second terminal,
wherein the switching circuit comprises:
a first switch coupled to the first terminal of the network of flying capacitors and switches, the first switch configured to be coupled to a power source;
a second switch coupled to the first switch, the inductor, and the first terminal of the network of flying capacitors and switches;
a third switch coupled to the second switch, the inductor, and the second terminal of the network of flying capacitors and switches;
a fourth switch coupled to the third switch and the second terminal of the network of flying capacitors and switches, the fourth switch configured to be coupled to a ground; and
a fifth switch coupled to the first switch and the second terminal of the network of flying capacitors and switches, the fifth switch configured to be coupled to the power source;
wherein:
the inductor is coupled to a first node that is coupled between the second switch and the third switch;
the second switch is coupled between the first switch and the third switch;
the third switch is coupled between the second switch and the fourth switch;
the first terminal of the network of flying capacitors and switches is coupled to a second node that is coupled between the first switch and the second switch, with neither the first switch nor the second switch coupled between the first terminal and the second node; and
the second terminal of the network of flying capacitors and switches is coupled to a third node that is coupled between the third switch and the fourth switch, with neither the third switch nor the fourth switch coupled between the second terminal and the third node;
wherein, responsive to operating in the buck mode, the multiple switches are configured to disconnect each capacitor of the at least two flying capacitors from at least one of the first terminal of the network of flying capacitors and switches or the second terminal of the network of flying capacitors and switches; and
wherein, responsive to operating in the boost mode, the multiple switches are selectively configured to connect the at least two flying capacitors in parallel according to a charging phase and connect the at least two flying capacitors in series according to a discharging phase.

10. The apparatus of claim 9, wherein:
the second switch is configured to be in a closed state to connect the first terminal of the network of flying capacitors and switches to the inductor;
the third switch is configured to be in an open state;
the first switch and the fourth switch are configured to be in the closed state and the fifth switch is configured to be in the open state to enable the at least two flying capacitors to be charged; and the first switch and the fourth switch are configured to be in the open state and the fifth switch is configured to be in the closed state to enable the at least two flying capacitors to be discharged.

11. The apparatus of claim 9, wherein:
the at least two flying capacitors comprises a first flying capacitor and a second flying capacitor; and
the multiple switches comprise:
   a sixth switch coupled to a first terminal of the first flying capacitor and a first terminal of the second flying capacitor;
   a seventh switch coupled between a second terminal of the first flying capacitor and a second terminal of the second flying capacitor; and
   an eighth switch coupled between the first terminal of the first flying capacitor and the second terminal of the second flying capacitor.

12. The apparatus of claim 1, wherein the switch-mode power supply comprises a three-level buck converter with an integrated boost regulator.

13. The apparatus of claim 1, further comprising:
at least one antenna; and
a wireless transceiver coupled to the at least one antenna, the wireless transceiver configured to accept power from the switch-mode power supply.

14. The apparatus of claim 13, further comprising:
an average-power-tracking module, wherein:
the wireless transceiver comprises a power amplifier configured to accept a supply voltage from the switch-mode power supply; and
the average-power-tracking module is configured to adjust a voltage level of the supply voltage.

15. The apparatus of claim 1, wherein the first node comprises a switch node.

16. The apparatus of claim 11, wherein:
the sixth switch comprises a first parallel switch;
the seventh switch comprises a second parallel switch; and
the eighth switch comprises a series switch.

* * * * *